Patented Sept. 26, 1950

2,523,926

UNITED STATES PATENT OFFICE 2,523,926

RUBBERY BUTADIENE-STYRENE COPOLYMER COMPOUNDED WITH AN ACID SOLUBLE HYDROCARBON OIL

Lawrence R. Sperberg, Phillips, Tex., and Chester C. Crawford, Bartlesville, Okla., assignors to Phillips Petroleum Company, a corporation of Delaware No Drawing. Application January 5, 1948, Serial No. 648

4 Claims. (Cl. 260—33.6)

This invention relates to rubber materials. In one aspect this invention relates to compositions of natural rubber, reclaimed rubber, and natural rubber substitutes or synthetic elastomers, in which plasticizers or softeners have been incorporated. In a more specific aspect this invention is related to the utilization of acid soluble oils obtained as a by-product from a hydrocarbon conversion process wherein an inorganic acid such as hydrofluoric acid comprises the catalyst.

In the processing of rubber, herein comprising natural rubber, reclaimed rubber, and synthetic elastomers of the types comprising polymers of butadiene, butadiene-styrene, chloroprene, butadiene-acrylonitrile, etc., as described more fully hereinafter, it is necessary to compound or mix said rubber with certain ingredients which accentuate certain characteristics for the use intended. Several such ingredients are, for example, suitable reinforcing pigments as carbon black, zinc oxide, or magnesium carbonate, various accelerators, sulfur, etc., and are among those which in various combinations impart improved properties to the final vulcanizate as aforementioned, said properties comprising abrasion, flex-life, hysteresis, resistance to tear, tensile strength, elongation, and modulus, etc.

Raw rubber stocks are tough and non-plastic and must be softened or rendered in a plastic condition to readily absorb the compounding ingredients aforedescribed. Mixing of tough rubber stocks with compounding ingredients is effected by means of mastication or softening at a controlled temperature in the range of 50–350° F. Mastication involves mechanically kneading the rubber material either by passing it through an open mill, i. e. passing it between rollers running at different speeds whereby it is subjected to compression followed by a shearing action, or by placing it in an enclosed mixer of the Banbury type where much the same effect is produced. The open mill and the Banbury type mixer comprise standard equipment used in compounding rubber. Mastication or softening referred to hereinafter as milling, is time consuming, requires power and liberates great heat to a damaging extent. Consequent excessive temperatures during the milling of the rubber material are undesirable since they usually lead to prevulcanization or scorching, difficulty of maintaining uniform thickness in calendered or extruded mixtures, and to excessive shrinkage. Various known agents are used to aid milling by virtue of their affinity for the rubber material and are referred to hereafter as rubber plasticizers or softeners. Plasticizers or softeners when incorporated with rubber-like materials serve to increase the pliability, durability and tack of the composition as well as to facilitate compounding, both by aiding the dispersion of solids and by lubricating the mix, whereby less power is consumed in the mixing, and prevulcanization is greatly minimized. Many of the types of softeners used are vegetable and mineral oils, waxes, asphalts, rosin, and tars. The various softeners function is different capacities but generally are of a solvent, swelling, or lubricating type and are added on the mill, thereby conditioning said rubber material for mixing or compounding as aforedescribed. The effectiveness of the various softeners differs greatly and the proportions in which they are added vary. The addition of softeners to rubber stocks modifies the properties of the final vulcanizate considerably. In order to carry out the processing satisfactorily, large quantities of softeners are oftentimes necessary. This is especially true in the procesing of rubber substitutes or synthetic elastomers, wherein milling presents added difficulties, since the oxidative breakdown which occurs in the plasticizing of natural rubber does not occur to the same degree in the processing of high molecular weight synthetic rubbers which are frequently tough and difficult to mill. In most instances, depending upon the quantity present and the efficiency of different plasticizers, certain physical properties are degraded by the addition of softener, to the rubber mix, especially by large quantities of softener thereby resulting in the lowering of the abrasion resistance, tensile strength, and other properties.

We have now found novel softeners which by their incorporation with rubber stocks, provide rubber compositions of desired plasticity and tack on the mill and which as regards stress-strain properties and high abrasion resistance provide for superior rubber products.

This invention has as an object to provide novel rubber plasticizers.

Another object of this invention is to provide rubber compositions especially suited for tire tread stocks and for applications requiring a high degree of reinforcement.

A further object of this invention is to provide rubber compositions and novel plasticizers incorporated therein, the novel plasticizers comprising acid soluble oils or fractions thereof, obtained as a by-product of a hydrocarbon conversion wherein an inorganic acid such as hydrofluoric acid comprises the catalyst.

Still a further object of this invention is to provide a method of plasticizing or softening natural rubber or synthetic elastomers.

Other objects and advantages of this invention will become apparent to one skilled in the art from the accompanying disclosure and discussion.

The novel effective softeners of our invention are the acid soluble oils, or a fraction or fractions thereof, said acid soluble oils being obtained from a hydrocarbon conversion process wherein an inorganic acid such as hydrofluoric acid comprises the catalyst, and which is more fully described hereinafter.

In the conversion of certain hydrocarbons in the presence of a catalyst comprising hydrofluoric acid, acid soluble oils are formed as by-products and are present in the acid phase. Perhaps one of the most important of such conversion processes in which acid soluble oils are formed is the alkylation of hydrocarbons in the presence of hydrofluoric acid as a catalyst. This so-called hydrofluoric acid alkylation involves reaction of an isoparaffin, particularly isobutane, or an aromatic hydrocarbon such as benzene, toluene, xylene, and the like, with an alkylative reactant such as propylene, various butylenes, amylenes, and olefin mixtures boiling up to 500° F. The reactants are contacted at temperatures in the range of 50-150° F. and under sufficient pressure to maintain the reactants in liquid phase with liquid concentrated hydrofluoric acid for a reaction period ranging from about 1-45 minutes. The reaction effluent is passed to a settling zone wherein the liquid hydrocarbon-rich phase and the heavier liquid hydrofluoric acid-rich phase are separated.

The hydrofluoric acid catalyst initially anhydrous and having an HF content in the range of 95-99 per cent gradually becomes contaminated with such impurities as water, organic fluorine compounds, heavy oils, etc., which stay in solution in the acid. When the hydrofluoric acid content, or acidity, of the acid phase becomes as low as about 75 per cent by weight, under-reacting as a result of reduced catalyst activity is encountered and the acidity must be restored to and maintained at values higher than 75 weight per cent, usually in the range of 85-90 weight per cent. The acidity of the catalyst is usually maintained in the range of 80-90 per cent by passing the acid phase or a portion thereof to a purification means or an acid rerun unit wherein the impurities, including the acid soluble oils of our invention, are removed and the purified hydrofluoric acid returned to the active catalyst in the hydrofluoric acid conversion process. The acid phase contains in addition to the impurities above mentioned, physically dissolved minor amounts of hydrocarbon reactants which may be separated by an extraction means employing a heavy fraction of the final product of the conversion process as an extracting agent. For example, in a hydrofluoric acid alkylation process, heavy alkylate may serve as the extraction agent. The acid layer subsequent to the extraction, abovedescribed, is heated to a temperature in the range of 250-300° F. and then flashed in a baffled tower wherein the free acid and water are vaporized and passed overhead and the soluble oils and other heavy materials, not vaporized, descend into a packed acid-oil fractionator. The fractionator kettle is operated at temperatures approximating 400° F. and higher, and provides therein a means of vaporizing any free hydrofluoric acid and/or water remaining in solution with the said heavy materials and of decomposing the organic fluorine compounds therein. The free HF, water, and decomposed compounds aforesaid are passed overhead. The bottom product of the said fractionator comprises the acid soluble oils of our invention, is substantially free of water and fluorine-containing compounds, and of traces of hydrofluoric acid, boils mostly in the gas-oil range, and is partially cyclic. These acid soluble oils occur as by-products of the various hydrocarbon conversion processes employing a catalyst comprising hydrofluoric acid such as, for example, alkylation as aforedescribed, isomerization, wherein normal paraffin or olefin hydrocarbons are converted to more branched type compounds and cyclic hydrocarbons are converted to other higher and lower boiling cyclic compounds, and reforming, wherein normal paraffin hydrocarbons such as normal butane, normal pentane, hexanes, heptanes, etc., are disproportionated to both high and low-boiling isoparaffin hydrocarbons such as would occur when normal pentane is converted to isobutane, isopentane, isohexanes, etc. The acid soluble oils occur as the major source of contamination of the hydrofluoric acid catalyst and comprise from about 1-2 per cent, to as high as about 12 per cent by weight of the acid phase. The following data represent an ASTM type distillation of an acid soluble oil and are considered to be generally representative of acid soluble oils obtained as a by-product of hydrocarbon conversion processes employing hydrofluoric acid containing catalysts.

*ASTM distillation, °F.*

| | |
|---|---|
| First drop | 220 |
| 5 | 480 |
| 10 | 546 |
| 30 | 604 |
| 50 | 627 |
| 60 | 635 |
| 70 | [1] 640 |

[1] Cracking begins.

When referring herein to a catalyst comprising hydrofluoric acid it is to be understood that not only hydrofluoric acid alone is meant, but any of the various hydrofluoric acid-containing catalysts employed in hydrocarbon conversion processes such as for example, those processes aforesaid. Hydrofluoric acid-containing catalysts herein comprise hydrofluoric acid alone or mixtures of hydrofluoric acid as the chief component with sulfuric acid, boron fluoride, metalloid halides of the type of phosphorous pentafluoride or with other promoters or modifiers, all in minor proportions usually comprising 1-5% by weight of the said mixture although in some instances comprising a proportion as high as 10% by weight or higher. Hydrofluoric acid-containing catalysts comprising mixtures as described above, are employed in a manner substantially the same as that for hydrofluoric acid alone with only minor modifications that will be obvious from the nature of the additional component or components of the catalyst. The acid soluble oils of our invention occur as a by-product of any hydrocarbon conversion process employing a catalyst comprising hydrofluoric acid and vary in composition somewhat, dependent upon such factors as the nature of the hydrocarbon charge stock, the particular hydrocarbon conversion process employed, and the additional component or components of the hydrofluoric acid catalyst, if any are present.

By vacuum distillation of the aforedescribed acid soluble oils, resins varying in physical state from a semi-solid, slightly tacky material to a hard brittle mass may be obtained. We have found that these semi-resinous and resinous polymers, when incorporated as softeners with natural, synthetic, or reclaimed rubber stocks, provide rubber compositions of improved processing characteristics and physical properties, especially as regards tensile strength and abrasion resistance. The properties of the acid soluble oil and the resinous materials prepared therefrom are presented in the following tabulation:

*Properties of HF-acid soluble oil*

| | |
|---|---|
| API gravity @ 60° F. | 10–30 |
| Viscosity SUS @ 100° F.[1] | 100–1000 |
| Viscosity SUS @ 210° F.[1] | 40–80 |
| Flash point, COC, °F.[2] | 190–250 |
| Fire point, COC, °F.[2] | 220–270 |
| Pour point, °F.[3] | −30–5+ |
| Total solids, per cent[4] | 65–80 |
| Iodine number[5] | 150–300 |
| Aniline point, °C.[6] | 30–100 |
| Free HF[7] | None |

*Properties of resins from acid soluble oil*

| | |
|---|---|
| Yield, weight per cent of charge | 15–40 |
| Distillation at 10 mm. °F. | 390–600 |
| Softening point, °F[8] | 110–170 |
| Iodine number[5] | 155–160 |
| Ash[9] | Trace |
| Acidity[7] | Less than 0.3 |

[1] A. S. T. M. designation 446—39.
[2] A. S. T. M. designation D92—45.
[3] A. S. T. M. designation D97.
[4] A. S. T. M. designation D154.
[5] Wijs method—gms. iodine/100 gms. sample.
[6] A. S. T. M. designation D611—44T.
[7] A. S. T. M. designation D663—44T.
[8] A. S. T. M. designation D36—26.
[9] A. S. T. M. designation D128.

The plasticizing effects of the oil and the resins are similar, and the choice of material depends upon types of mixers, facilities for shipping, storage, handling, and the like.

The rubber compositions of our invention comprise natural rubber, synthetic elastomers or rubber substitutes, and reclaimed rubber, and in each case the novel softener incorporated therein. Suitable reinforcing pigments such as carbon black, zinc oxide, or magnesium carbonate, and other fillers, sulfur and accelerators are understood to be included in any case.

The natural rubber substitutes, or synthetic elastomers, may be prepared by either emulsion polymerization or homogeneous polymerization (sometimes called mass polymerization). The elastomers are prepared by polymerization of conjugated diolefins such as butadiene, isoprene, piperylene and the like, either alone or in admixture with each other or with other polymerizable organic compounds such as styrene, dichlorostyrene, vinylpyridine, acrylonitrile and the like. In emulsion polymerization, various modifiers, initiators, emulsifying agents, etc. may be employed. In the homogeneous type polymerization, catalysts such as alkali metals and the like may be employed. The following is a conventional recipe for the emulsion type preparation of a butadiene-styrene copolymer and is that employed in the preparation of the butadiene-styrene elastomer referred to in the examples herein:

| | Parts by weight |
|---|---|
| Butadiene | 75 |
| Styrene | 25 |
| Potassium persulfate | 0.30 |
| Tert. —$C_{12}$ mercaptan | 0.28 |
| Soap | 5.0 |
| Water | 180 |

The ingredients are emulsified and polymerization is allowed to progress for 8 hours at 122° F. with constant agitation. The resulting latex is inhibited with 2.5 parts of phenylbetanaphthylamine and then coagulated with aluminum sulfate solution. The polymer is recovered and dried until substantially free of water.

Although the examples of the invention are in terms of the butadiene-styrene copolymer as above described, it is to be understood that the acid soluble oils plasticize other synthetic elastomers as well as reclaimed rubber and natural rubber.

Stocks from our compositions are especially useful for footwear, tire carcasses and treads and hard rubber mechanical goods, due to their excellent stress-strain properties and high abrasion resistance. In Example I is shown a tabulation of stress-strain and abrasion properties of eight butadiene-styrene copolymer compositions in each of which an acid soluble oil or a defined fraction thereof has been incorporated as a softener. The rubber softeners of our invention comprise as high as 50 per cent by weight, and preferably in the range of 3–20 per cent by weight of our compositions.

Advantages of this invention are illustrated by the following examples. The reactants and their proportions and other specific ingredients of the recipes are presented as being typical and should not be construed to limit the invention unduly.

*Example I*

Two samples of an acid soluble oil designated as "ASO light" and "ASO heavy" having respective gravities @ 60° F. of 24.7 and 22.5° API were each divided into three different boiling fractions and were evaluated in the following tire tread type composition. For reference purposes an asphalt type softener is included, said softener comprising an example of such softeners used in tire tread stocks.

| | Parts by weight |
|---|---|
| Butadiene-styrene copolymer | 100 |
| Carbon black (furnace type) | 17 |
| Channel black | 35 |
| Zinc oxide | 3 |
| Sulfur | 1.75 |
| Accelerator[1] | 1.07 |
| Softener | 8.00 |

[1] Condensation product of mercaptobenzothiazole and cyclohexylamine.

The acid soluble oil fractions employed were of the following boiling ranges, °F.:

| ASO Light | ASO Heavy |
|---|---|
| (1) 132 to 303 | (4) 183 to 370 |
| (2) 296 to 470 | (5) 356 to 482 |
| (3) >470 (Resinous) | (6) >482 (Resinous) |

Stress-strain and abrasion properties measured at 80° F. were as follows:

| Fraction | Unaged | | | Oven Aged 24 hrs. @ 212° F. | | | Abrasion, gms. loss |
|---|---|---|---|---|---|---|---|
| | Stress, p. s. i. | | Per Cent Elongation at break | Stress, p. s. i. | | Per Cent Elongation at break | |
| | 300% Modulus | Tensile | | 300% Modulus | Tensile | | |
| (1) | 1,370 | 2,460 | 490 | 2,425 | 2,620 | 330 | 2.45 |
| (2) | 1,190 | 2,570 | 520 | 2,220 | 2,730 | 360 | 2.79 |
| (3) | 1,200 | 2,740 | 570 | 2,180 | 2,860 | 400 | 3.27 |
| (4) | 1,320 | 2,650 | 510 | 2,350 | 2,990 | 385 | 2.68 |
| (5) | 1,200 | 2,460 | 515 | 2,170 | 2,610 | 360 | 3.20 |
| (6) | 1,060 | 2,350 | 515 | 1,950 | 2,720 | 410 | 3.80 |
| "ASO Light" | 1,250 | 2,700 | 545 | 2,290 | 2,635 | 345 | 2.91 |
| "ASO Heavy" | 1,280 | 2,740 | 540 | | | | 2.89 |
| Asphalt Type Softener [1] | 1,195 | 2,665 | 560 | 2,005 | 2,565 | 375 | 3.53 |

[1] Asphalt.

All samples exhibited good plasticizing effects of the acid soluble oils and fractions thereof on the mill. The stress-strain and the abrasion resistance properties show the total acid soluble oil, and the fraction or fractions thereof to be effective plasticizers and to be especially suitable for tire tread and other applications requiring a maximum of reinforcement.

Oftentimes, in order to carry out processing satisfactorily and to arrive at a desired degree of quality commensurate with cost, large quantities of softeners are necessary and consequently, in some instances, other qualities of the vulcanizate are impaired thereby. Butadiene-styrene copolymer compositions for a soft type shoe sole stock were prepared, as shown in Example II, employing acid soluble oils as softeners in quantities larger than those used in tire tread compositions.

*Example II*

The following soft type shoe sole butadiene-styrene copolymer composition was prepared employing acid soluble oil as a softener.

| | Parts by weight |
|---|---|
| Butadiene-styrene copolymer | 100 |
| Soft carbon black | 100 |
| Softener | 40 |
| Zinc oxide | 3 |
| Sulfur | 2 |
| Accelerator [1] | 1.2 |
| Accelerator [2] | 1.2 |

[1] Benzothiazyldisulfide.
[2] An ester of two molecules of diphenyl guanidine and one molecule phthalic acid.

A regular production sole stock (factory control) was evaluated for comparison. Stress-strain and abrasion properties were measured at 80° F. and are as follows:

| Softener | Minutes Cure @ 267° F. | Stress, p. s. i. | | | | at Break | Per Cent Elongation at Break |
|---|---|---|---|---|---|---|---|
| | | Per Cent Elongation | | | | | |
| | | 100 | 200 | 300 | 400 | | |
| UNAGED | | | | | | | |
| Acid Soluble Oil | 45 | 270 | 930 | 1,640 | 2,020 | 2,020 | 400 |
| | 75 | 260 | 990 | 1,740 | | 2,100 | 375 |
| Control | 45 | 605 | 1,275 | | | 1,480 | 280 |
| | 75 | 710 | 1,475 | | | 1,560 | 255 |
| OVEN AGED 24 HRS. @ 212° F. | | | | | | | |
| Acid Soluble Oil | 45 | 995 | | | | 2,040 | 165 |
| | 150 | 770 | 2,000 | | | 2,270 | 240 |
| Control | 45 | 1,320 | | | | 1,620 | 140 |
| | 150 | 1,170 | | | | 1,700 | 190 |

Abrasion tests for the above 75 minute cure samples gave the following results:

*Abrasion loss (gms.)*

| Softener | Unaged | Oven Aged 24 hrs. @ 212° F. |
|---|---|---|
| Acid Soluble Oil | 5.41 | 3.46 |
| Control | 11.53 | 11.13 |

The example demonstrates the utility of the acid soluble oil softener by virtue of the excellent stress-strain and abrasion properties exhibited.

*Example III*

A butadiene-styrene copolymer hard type shoe sole composition was prepared as follows, in which said soluble oil was the softener employed.

| | Parts by weight |
|---|---|
| Butadiene-styrene copolymer | 100 |
| Furnace type black | 75 |
| Softener | 10 |
| Zinc oxide | 3 |

| | Parts by weight |
|---|---|
| Sulfur | 1.75 |
| Accelerator [1] | 1.35 |
| Accelerator [2] | 0.225 |

[1] Condensation product of mercaptobenzothiazole and cyclohexylamine.
[2] Reaction product of butyraldehyde and butylidene aniline.

Stress-strain and abrasion properties as follows were measured at the temperatures indicated in the following table.

| Minutes Cure @ 320° F. | Stress, p. s. i. | | | | | at Break | Per Cent Elongation at Break | Abrasion Loss, gms. |
|---|---|---|---|---|---|---|---|---|
| | Per Cent Elongation | | | | | | | |
| | 100 | 200 | 300 | 400 | 500 | | | |
| UNAGED, MEASURED @ 80° F. | | | | | | | | |
| 5 | 150 | 380 | 420 | 580 | 645 | 680 | 580 | |
| 8 | 290 | 630 | 1,120 | 1,570 | | 1,890 | 485 | |
| 12 | 365 | 1,000 | 1,890 | 2,500 | | 2,810 | 425 | 1.71 |
| 25 | 480 | 1,420 | 2,225 | 2,790 | | 2,800 | 415 | |
| UNAGED, MEASURED @ 200° F. | | | | | | | | |
| 5 | 100 | 200 | | | | 200 | 200 | |
| 12 | 420 | 970 | | | | 1,290 | 260 | |
| OVEN AGED 24 HRS. @ 212° F., MEASURED @ 80° F. | | | | | | | | |
| 8 | 920 | 2,375 | | | | 2,840 | 245 | |
| 12 | 980 | 2,390 | | | | 2,910 | 230 | 1.10 |

Milling characteristics indicated good plasticizing properties of the softener.

*Example IV*

A butadiene-styrene copolymer shoe upper stock composition was prepared as follows, in which acid soluble oil was the softener employed.

| | Parts by weight |
|---|---|
| Butadiene-styrene copolymer | 100 |
| Furnace type carbon black | 100 |
| Softener | 25 |
| Zinc oxide | 3 |
| Sulfur | 2 |
| Accelerator [1] | 0.8 |
| Accelerator [2] | 0.8 |

[1] Benzothiazyldisulfide.
[2] An ester of two molecules of diphenyl guanidine and one molecule phthalic acid.

A commercial factory control stock was evaluated for comparison. Stress-strain properties were measured at 80° F. and are as follows:

| Softener | Minutes Cure @ 267° F. | Stress, p. s. i. | | | | at Break | Per Cent Elongation at Break |
|---|---|---|---|---|---|---|---|
| | | Per Cent Elongation | | | | | |
| | | 100 | 200 | 300 | 400 | | |
| UNAGED | | | | | | | |
| Acid Soluble Oil | 45 | 405 | 1,255 | 2,100 | | 2,490 | 365 |
| | 75 | 430 | 1,410 | 2,330 | | 2,530 | 335 |
| Control | 45 | 330 | 820 | 1,235 | 1,520 | 1,610 | 450 |
| | 75 | 350 | 900 | 1,365 | 1,625 | 1,640 | 405 |
| OVEN AGED 24 HRS. @ 212° F. | | | | | | | |
| Acid Soluble Oil | 45 | 1,110 | | | | 2,240 | 185 |
| | 150 | 810 | 2,150 | | | 2,340 | 225 |
| Control | 45 | 850 | 1,620 | | | 1,785 | 225 |
| | 150 | 660 | 1,430 | | | 1,775 | 270 |

Advantages of our composition lie in the low cost of the softeners and their good plasticizing effect, with resultant rubber products of good physical properties, especially as regards abrasion resistance and tensile strength. In hard rubber products where high modulus and low elongations are characteristic, these compositions are particularly suitable and are useful also for tire tread stocks of high abrasion resistance.

As will be evident to those skilled in the art, various modifications of this invention can be made or followed, in the light of the foregoing disclosure and discussion, without departing from the spirit or scope of the disclosure or from the scope of the claims.

We claim:

1. As a new composition of matter, a rubbery copolymer of 1,3-butadiene and styrene compounded with from 8 to 40 weight per cent of an acid-soluble oil, said acid-soluble oil comprising a by-product of an alkylation of an isoparaffin hydrocarbon with a low-boiling olefin hydrocarbon in the presence of a catalyst comprising hydrofluoric acid, said alkylation comprising introducing an isoparaffin and an olefin into an alkylation zone containing an alkylation catalyst comprising hydrofluoric acid and therein reacting said isoparaffin with said olefin at a temperature in the range of 50 to 150° F. to form alkylate, separating effluent from said alkylation zone into a hydrocarbon phase containing alkylate and a hydrofluoric acid phase containing impurities comprising water, organic fluorine compounds and a by-product oil, recovering alkylate from said hydrocarbon phase; recovering said acid-soluble oil from said acid phase by removing said hydrofluoric acid phase from the zone of said separating and heating same to a temperature in the range of 250 to 350° F. and passing acid phase thus heated to a flash distillation zone and therein separating hydrofluoric acid and water as an overhead flash distillation product, passing residual oil product from said flash distillation zone to a fractionation zone wherein a kettle temperature of about 400° F. is employed, in said fractionation zone decomposing organic compounds and recovering same as overhead fractionation product together with any free hydrofluoric acid and water not removed from said flash distillation above described, recovering oil kettle product free of water, hydrofluoric acid and organic fluorine compounds from said fractionation zone; said oil kettle product being said acid-soluble oil and having an API gravity at 60° F. in the range of 10 to 30, a viscosity at 100° F. in the range of 100 to 1000 SUS, a flash point in the range of 190 to 250° F., a fire point in the range of 220 to 270° F., a pour point at a temperature in the range of −30 to 5, a total solids content in the range of 65 to 80 per cent by weight, an iodine number within the limits of 150 to 300 and an aniline point within the range of 30 to 100.

2. As a new composition of matter, a rubbery copolymer of 1,3-butadiene and styrene, compounded with from 8 to 40 weight per cent of an acid-soluble oil, said acid-soluble oil having an API gravity at 60° F. in the range of 10 to 30, a viscosity at 100° F. in the range of 100 to 1000 SUS, a flash point in the range of 190 to 250° F., a fire point in the range of 220 to 270° F., a pour point at a temperature in the range of −30 to 5, a total solids content in the range of 65 to 80 per cent by weight, an iodine number within the limits of 150 to 300 and an aniline point within the range of 30 to 100, and produced by reacting a hydrocarbon stock in the presence of a catalyst comprising hydrofluoric acid, separating from a resulting reaction mixture a hydrocarbon phase containing a hydrocarbon reaction product, and a hydrofluoric acid phase containing impurities comprising an oil and organic fluorine compounds, flash distilling said hydrofluoric acid phase to remove hydrofluoric acid therefrom as an overhead flash distillation product, fractionating residual flash distillation product and concomitantly decomposing organic fluorine compounds and removing decomposition products thus formed as overhead fractionation product, recovering a kettle product from said fractionation free of hydrofluoric acid and organic fluorine compounds, said kettle product being said acid soluble oil.

3. As a new composition of matter, a rubbery copolymer of 1,3-butadiene and styrene, compounded with from 8 to 40 weight per cent of an acid-soluble oil, said acid-soluble oil having an API gravity at 60° F. in the range of 10 to 30, a viscosity at 100° F. in the range of 100 to 1000 SUS, a flash point in the range of 190 to 250° F., a fire point in the range of 220 to 270° F., a pour point at a temperature in the range of −30 to 5, a total solids content in the range of 65 to 80 per cent by weight, an iodine number within the limits of 150 to 300 and an aniline point within the range of 30 to 100, and produced by reacting a hydrocarbon stock in the presence of a catalyst comprising hydrofluoric acid, separating from a resulting reaction mixture a hydrocarbon phase containing a hydrocarbon reaction product, and a hydrofluoric acid phase containing oil-soluble impurities, flash distilling said hydrofluoric acid phase to remove hydrofluoric acid therefrom as an overhead flash distillation product, recovering a kettle product from said flash distilling free of hydrofluoric acid, said kettle product being said acid soluble oil.

4. A composition in accordance with claim 3 wherein said acid soluble oil is a resinous residual fraction recovered from said kettle product by removal of light constituents by vacuum distillation, said residual fraction comprising from 15 to 40 per cent of said kettle product and distilling in the range of 390 to 600° F. at a pressure of 10 mm. of Hg, having an iodine number in the range of 155 to 160, having a softening point in the range of 110 to 170° F., and having an acidity of less than 0.3.

LAWRENCE R. SPERBERG.
CHESTER C. CRAWFORD.

REFERENCES CITED

The following references are of record in the file of this patent:

UNITED STATES PATENTS

| Number | Name | Date |
|---|---|---|
| 2,008,102 | Hyman | July 16, 1935 |
| 2,422,002 | Elwell et al. | June 10, 1947 |
| 2,440,459 | Bloch | Apr. 27, 1948 |
| 2,470,894 | Johnstone | May 24, 1949 |

Certificate of Correction

Patent No. 2,523,926                                      September 26, 1950

LAWRENCE R. SPERBERG ET AL.

It is hereby certified that error appears in the printed specification of the above numbered patent requiring correction as follows:

Column 2, line 14, for the word "is" read *in*; column 8, line 67, for "said" read *acid*;

and that the said Letters Patent should be read as corrected above, so that the same may conform to the record of the case in the Patent Office.

Signed and sealed this 19th day of December, A. D. 1950.

[SEAL]

THOMAS F. MURPHY,
*Assistant Commissioner of Patents.*